US009457217B2

(12) United States Patent
Yin et al.

(10) Patent No.: US 9,457,217 B2
(45) Date of Patent: Oct. 4, 2016

(54) BODY-BUILDING POWER GENERATION APPARATUS AND A METHOD OF GENERATING POWER USING THE SAME (71) Applicant: Xiaolin Yin, Hunan (CN)

(72) Inventors: Xiaolin Yin, Changsha (CN); Wuji Yin, Changsha (CN)

(73) Assignee: Wuji Yin, Changsha (CN)

( * ) Notice: Subject to any disclaimer, the term of this patent is extended or adjusted under 35 U.S.C. 154(b) by 0 days.

(21) Appl. No.: 14/370,888

(22) PCT Filed: Jul. 11, 2013

(86) PCT No.: PCT/CN2013/079248
§ 371 (c)(1),
(2) Date: Jul. 7, 2014

(87) PCT Pub. No.: WO2014/146386
PCT Pub. Date: Sep. 25, 2014

(65) Prior Publication Data
US 2015/0375029 A1 Dec. 31, 2015

(30) Foreign Application Priority Data

Mar. 20, 2013 (CN) .......................... 2013 1 0089944
Mar. 21, 2013 (CN) .......................... 2013 1 0091973
Apr. 19, 2013 (CN) ..................... 2013 2 0199991 U (51) Int. Cl.
A63B 24/00 (2006.01)
F03G 5/00 (2006.01)
F03G 5/06 (2006.01)
H02P 9/06 (2006.01)
(Continued)

(52) U.S. Cl.
CPC ....... A63B 21/0055 (2015.10); A63B 21/0054 (2015.10); F03G 5/00 (2013.01); F03G 5/06 (2013.01); H02P 9/06 (2013.01); H02J 7/32 (2013.01); H02K 7/1861 (2013.01)

(58) Field of Classification Search
CPC .................... A63B 21/0055; A63B 21/00178; A63B 21/0053; A63B 24/00; A63B 24/0062
See application file for complete search history.

(56) References Cited

U.S. PATENT DOCUMENTS 7,504,737 B2 * 3/2009 Vasilovich ......... A63B 21/0053
290/1 C
8,485,944 B2 * 7/2013 Drazan .............. A63B 21/0053
482/1

(Continued)

Primary Examiner — Glenn Richman
(74) Attorney, Agent, or Firm — Cooley LLP; Ivor R. Elrifi; Matthew Pavao (57) ABSTRACT The present disclosure relates to a body-building power generation apparatus and a method of generating power using the power generation apparatus, comprising at least one fitness device, an energy storage device connected with the fitness device for transforming and storing the kinetic energy transmitted from the fitness device, wherein the energy stored in the energy storage device can be transformed into kinetic energy and outputted by an output mechanism connected with the energy storage device, a speed changing mechanism, receiving the kinetic energy from the output mechanism and outputting said kinetic energy after adjusting it, and a generator connected to the speed changing mechanism for transforming the adjusted kinetic energy into electric energy. The body-building power generation apparatus according to the present disclosure can satisfy or at least partially supplement the need of electricity in residential areas, office buildings, or leisure facilities; it can also act as backup power source to alleviate piezoelectricity or power failure in rush hours.

10 Claims, 9 Drawing Sheets (51) Int. Cl.
*H02J 7/32* (2006.01)
*H02K 7/18* (2006.01)

(56) References Cited

U.S. PATENT DOCUMENTS

| | | | |
|---|---|---|---|
| 8,772,984 B2 * | 7/2014 | Chang | A63B 21/00178 307/151 |
| 2001/0011052 A1 * | 8/2001 | Shu | A63B 21/0053 482/2 |
| 2007/0259756 A1 * | 11/2007 | Kuykendall | A63B 21/0055 482/2 |
| 2008/0172328 A1 * | 7/2008 | Ajilian | G06Q 20/10 705/39 |
| 2010/0230976 A1 | 9/2010 | Chou | |
| 2011/0263384 A1 * | 10/2011 | Drazan | A63B 21/0053 482/2 |
| 2014/0287875 A1 * | 9/2014 | Duval | A63B 21/0053 482/2 |

* cited by examiner

BODY-BUILDING POWER GENERATION APPARATUS AND A METHOD OF GENERATING POWER USING THE SAME

This application is the U.S. national stage of international patent application PCT/CN2013/079248, filed Jul. 11, 2013, which claims priority to Chinese Patent Application No. 201310089944.6, filed Mar 20, 2013; Chinese Patent Application No. 201310091973.6, filed Mar. 21, 2013; and Chinese Patent Application No. 201320199991.1, filed Apr. 19, 2013, each of which is hereby incorporated by reference in its entirety.

TECHNICAL FIELD

The present disclosure relates to the technical field of body-building power generation, in particular to a body-building power generation apparatus and a method of generating power using said power generation apparatus.

TECHNICAL BACKGROUND

As more and more countries are striving for conserving energy and developing green energy, generating power through body-building exercises, due to its characteristic of environmental friendliness, has been widely researched and developed by many institutions and individuals at home and abroad. For example, hand generator of various types as recited in various patent literatures including CN 201120480808.6, CN 200920057139.4, CN 200620036952.X, and CN 201220327672.X, a pedal power-generating car as recited in CN 201210397132.3 and CN 201220534336.3, a group movement power generator as recited in CN 201020168555.4, a motion generator as recited in CN 201020177308.0, a motion power generator as recited in CN 201220408526.X, a body-building generator as recited in CN 201210000925.7, and a moped with man-power generation as recited in CN 201120142609.4, etc. The above literatures propose the conception of hand operating or pedal generator. However, the technology or equipment thereof for hand operating or pedal power generation has the following defects:

1. The time people spend on fitness maintaining and body building is not taken into account in the prior art. Generally, a person would spend over ten minutes, but less than two hours on fitness exercises. The time that the power generation apparatus is directly driven by the fitness exercises is very limited, thus, the generator can only work for a very limited time period, which means, electricity can be produced only when the fitness exercise is under operation.

2. Technically, the influence of factors such as the explosive force, attenuating property, instability, and the discontinuity of human strength on power generation has not been resolved.

3. The power generated by body-building exercises is not only small in amount, but also questionable in quality. In most cases, the voltage produced cannot effectively charge the rechargeable battery. Even when the battery is charged to a certain extent, it still cannot satisfy the operating requirements of household appliances or office machinery which are sensitive to voltage and current fluctuation.

SUMMARY OF THE INVENTION

The technical problem to be solved by the present disclosure is how to provide a body-building power generation apparatus which can accumulate energy from body-building exercises and generate electricity. The body-building power generation apparatus according to the present disclosure can satisfy or at least partially supplement the need of electricity in residential areas, office buildings, or leisure facilities; it can also act as backup power source to alleviate piezoelectricity or power failure in rush hours.

To solve the above problem, the present disclosure provides a body-building power generation apparatus, comprising:
 at least one fitness device,
 an energy storage device connected with the fitness device for transforming and storing the kinetic energy transmitted from the fitness device, wherein the energy stored in the energy storage device can be transformed into kinetic energy and outputted by an output mechanism connected with the energy storage device,
 a speed changing mechanism, receiving the kinetic energy from the output mechanism and outputting said kinetic energy after adjusting it, and
 a generator connected to the speed changing mechanism for transforming the adjusted kinetic energy into electric energy.

As compared with the prior art, the body-building power generation apparatus of the present disclosure has many advantages. According to the present disclosure, kinetic energy is generated when a body-builder is doing exercises on the fitness device and transformed into an energy form which can be stored in the energy storage device. The energy storage device transforms the energy intermittently coming in and stores the transformed one therein. An output mechanism, which is connected with the energy storage device, transforms the energy accumulated in the energy storage device into kinetic energy and outputs the kinetic energy therefrom. Hence, the kinetic energy intermittently generated from the fitness device can be accumulated and turned into continuous energy via the output mechanism. Therefore, the present disclosure solves the problem of the power generation apparatus directly driven by the fitness device that electricity can only be generated when the fitness exercise is under operation and power failure occurs when the fitness exercise stops. In the meantime, using an energy storage device can also eliminate the influences of factors such as the explosive force, attenuating property, instability, and the discontinuity of human strength on power generation. Since the explosive force and attenuating property of human strength only affects the amount of energy generated within unit time, the output mechanism connected with the energy storage device according to the present disclosure can smoothly output the kinetic energy from the energy storage device, and thus the impact on the generator can be reduced. When the generator receives stable energy input, it can also output relatively stable voltage and current, thereby satisfying the operating requirements of general household appliances or office machinery.

In a preferred embodiment, an adjustment controlling mechanism and an electric energy storage device are connected to the generator. The adjustment controlling mechanism, which is also called a control module, is known as mature power supply and distribution technology. A voltage stabilizing/transforming variable frequency rectifier and power supplying module and a central processing unit are integrated into the adjustment controlling mechanism to purify the raw electric power generated by the generator, so that the electric power output can satisfy the operating requirements of household appliances and office machinery which are sensitive to the fluctuation of voltage and current. Besides supplying electric power to the local areas, the surplus electric power can be stored in the electric energy storage device, and supplied to the electrical equipment when the generator stops working. Surplus electric power, if any, can be fed to the state grid.

In another preferred embodiment, the electric energy storage device is rechargeable battery. Rechargeable battery is a commonly used electric energy storage device which can store surplus electricity and provide power to household appliances and electrical devices when the generator stops working.

In a preferred embodiment, two or more of the fitness device, energy storage device, speed changing mechanism, generator, adjustment controlling mechanism, and the electric energy storage device are assembled into at least one function box with an input port and an output port, said function box being made of wood or metal. The fitness device (excluding the foot pedal or hand operating components used by the body builder), energy storage box or energy storage gear in the energy storage mechanism, the gearbox and damper speed regulator module in the speed changing mechanism, generator, adjustment controlling mechanism, and the rechargeable battery can be assembled into a plurality of function boxes, including a movement device, an energy storage box, a speed changing box, a speed stabilizing box, and a generator box. Then, these function boxes can be assembled into an energy storage generator or generator set. Said energy storage box or energy storage gear, speed-up gearbox, and the damper speed regulator module can be arranged in one function box, or respectively arranged as an energy storage box, speed stabilizing box, energy storage speed stabilizing box, and speed changing box. Said energy storage box or energy storage gear, speed-up gearbox, damper speed regulator module, and the generator can be assembled into one energy storage generator box; or the energy storage box or energy storage gear, speed increasing gearbox, damper speed regulator module, generator, and the adjustment controlling mechanism can be assembled into one energy storage generator box; or the movement mechanism, the energy storage box or energy storage gear, speed-up gearbox, and the damper speed regulator module can be assembled into one body-building energy storage box. By arranging the respective parts into function boxes, the body-building power generation apparatus of the present disclosure appears more neat and tidy. At the same time, each part or component therein can be better protected, more easily installed, and more conveniently transported.

In another preferred embodiment, the speed changing mechanism comprises a single-stage or multi-stage speed-up gearbox, and a damper speed regulator module connected with said speed-up gearbox. The speed-up gearbox is used to transmit power, adjust the speed ratio and the rotation direction of the shaft. In order to satisfy the requirements for energy storage and the shaft speed and axial rotation direction of the generator, the arrangement of the speed-up gearbox should be determined based on various factors including the power input performance of the movement mechanism, energy storage capacity, the specifications, combination form, and the designed speed ratio of the energy storage box or energy storage gear, and the requirements of shaft speed and shaft rotation direction of the generator. The kinetic energy can be strengthened through the speed-up gearbox, thus facilitating driving the generator. The damper speed regulator module can keep the kinetic energy that drives the generator and the torque within a constant range, such that the voltage and current output from the generator can be relatively stable. Constant input and output can prolong the service life of the generator.

In another preferred embodiment, the damper speed regulator module comprises a coupling gear engaged with one gear in the speed-up gearbox, a speed stabilizing gear connected with a rotation shaft to which the coupling gear is connected, a pivoted fork, a driving lever of which is connected with the speed stabilizing gear, an inertial wheel connected with one end of the pivoted fork that is away from the driving lever through an eccentric shaft, and a damper coil spring comprising an elastomer and a coil spring, wherein one end of the coil spring and the inertial wheel are connected to a rotation shaft, and the other end thereof is connected with one end of the elastomer, an adjusting screw rod or adjusting nut being connected to the other end of the elastomer. Said coil spring can be substituted with leaf spring, wherein the central portion of the leaf spring and the inertial wheel are fixed to the same axle (namely the swing axle), and the two ends thereof are connected to the elastomer. The compressed length of the elastomer is controlled by adjusting the adjusting screw rod or adjusting nut. Adjustment of the elastomer acts as controlling means over the resilience of the coil spring or leaf spring. The resilience of the coil spring or leaf spring acts on the swing axle so as to control the swing velocity and swing amplitude of the inertial wheel. A pivoted fork which is connected with an eccentric shaft of the inertial wheel is used to control the rotating speed of the speed stabilizing gear, so that the torque of the input of the generator and the rotating speed thereof can be stabilized.

In another preferred embodiment, the energy storage device comprises an energy storage box or energy storage gear inside which an energy storage elastomer is arranged, said energy storage box or energy storage gear transforms the kinetic energy produced by the fitness device into potential energy in the energy storage elastomer. The energy storage elastomer can be a rope-shaped, or scrolled, or spiral-shaped, or coil spring shaped, or a leaf-shaped elastomer, made of material with high elasticity.

In another preferred embodiment, the fitness device include foot pedal type device, hand operating type device, and hybrid type device of the foot pedal type and the hand operating type. Generally, hand operating type device and foot pedal type device are the most commonly used, and they produce kinetic energy that is easily transferred through a power transmission mechanism.

In another preferred embodiment, the power transmission mechanism comprises a gear unit, a belt drive unit, a chain drive unit, or a friction drive unit. The type of power transmission mechanism used for transmitting the generated kinetic energy to the energy storage mechanism can be selected based on the specific features of the fitness device.

In another preferred embodiment, the power transmission mechanism and/or the speed changing mechanism are/is provided with a clutch switch module for switching the levels thereof. The clutch switch module can be operated with a manual driving lever or a electromagnetic driving means. By changing the levels of the speed changing mechanism according to actual requirements, different speed changing effects can be achieved.

The energy storage mechanism comprises at least one stage or one set of energy storage box or energy storage gear. Based on the specifications and models and the energy storage requirements, the energy storage box or energy storage gear can be selected and combined together. The energy storage mechanism comprises a single stage energy storage box or energy storage gear, preferably at least one stage energy storage box in series connection.

Another technical problem to be solved by the present disclosure is to provide a method of generating power through body-building exercises, which can solve the problems in the existing body-building power generation.

To solve the above technical problem, the present disclosure provides a method of generating power through body-building exercises, with the power generation apparatus according to the present disclosure, wherein kinetic energy is generated when a body builder is doing exercise on the fitness device, transformed into a form of energy that is able to be stored in the energy storage device, then stored in the energy storage device and output from the output mechanism, and the kinetic energy outputted is transmitted to the generator for power generation through the speed changing mechanism and then transformed into electric energy by the generator.

In a preferred embodiment, a plurality of body-building power generation apparatuses are arranged in fitness device intensive areas such as residential areas, gymnasiums, fitness centers, parks, and office buildings, etc. The electric power generated from the plurality of body-building power generation apparatuses is accumulated and then provided to those areas or the state grid. By centralizing electric power separately generated and providing it to the local areas or the state grid, the electric power can be fully used and the requirements of electricity can be better met.

The present disclosure has the following advantages:

1. The power generation apparatus according to the present disclosure can transform the non-continuous and instable kinetic energy generated from fitness device into potential energy stored in the elastomer of the energy storage device, such as energy storage box or energy storage gear. The potential energy can be transformed into kinetic energy and outputted by the output mechanism. The kinetic energy can be adjusted by the speed changing mechanism, and then fed to the generator for generating electricity in a continuous manner. A reasonably designed energy storage assembly of energy storage box or energy storage gear can store sufficient energy, so as to guarantee a capacity of the generator of continuously working for over 24 hours.

2. Taking advantage of the adjustment controlling mechanism and the electric energy storage device, which are already known in electrical technology, the power generation apparatus of the present disclosure can adjust and store the electric power generated by the generator for continuously supplying power to the electrical equipment in residences, offices, or leisure facilities.

3. The method of generating electric power according to the present disclosure is more efficient, more convenient, more economical, and more propagable than solar power generation.

DETAILED DESCRIPTION OF THE EMBODIMENTS

The present disclosure will be further explained in combination with the accompanying drawings and the embodiments.

Figure 1:
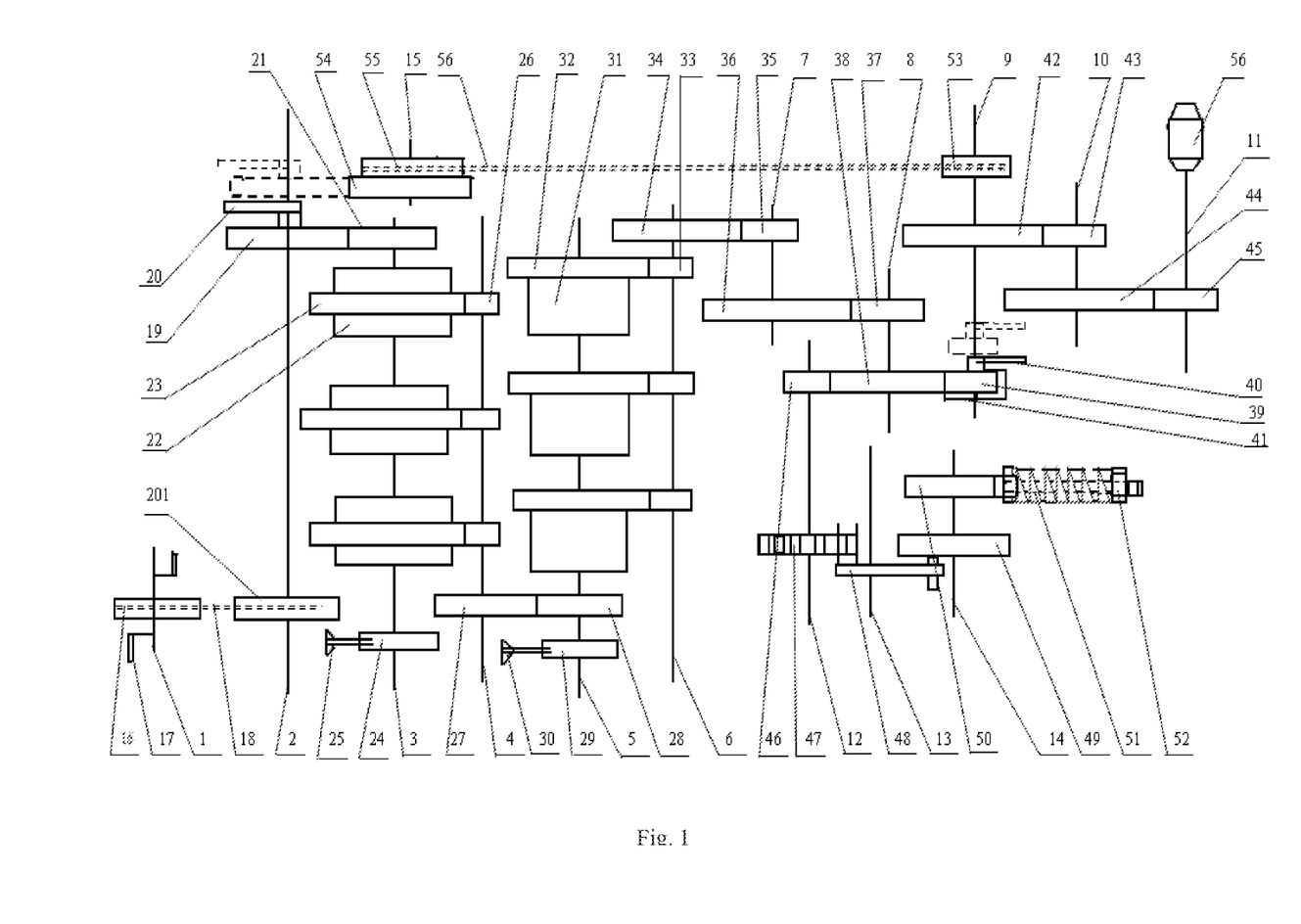
FIG. 1 schematically shows a foot pedal type energy storage power generation apparatus comprising six energy storage boxes of two stages and a hand operating clutch switching mechanism.
Figure 2:
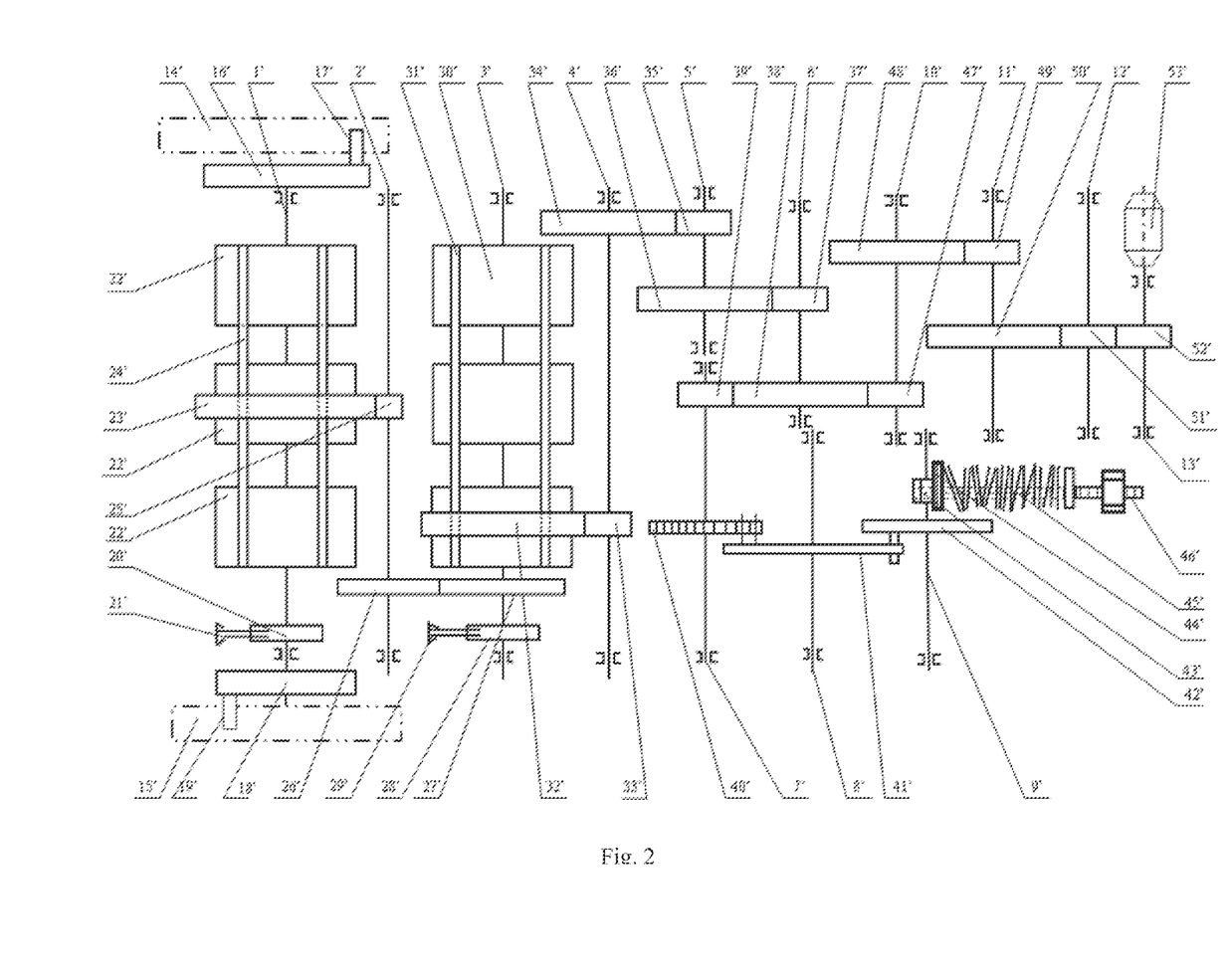
FIG. 2 schematically shows an energy storage power generation apparatus comprising two combined-type energy storage gears of two stages and a foot-pedal type movement mechanism or a hand operating push/pull movement mechanism.
Figure 3:
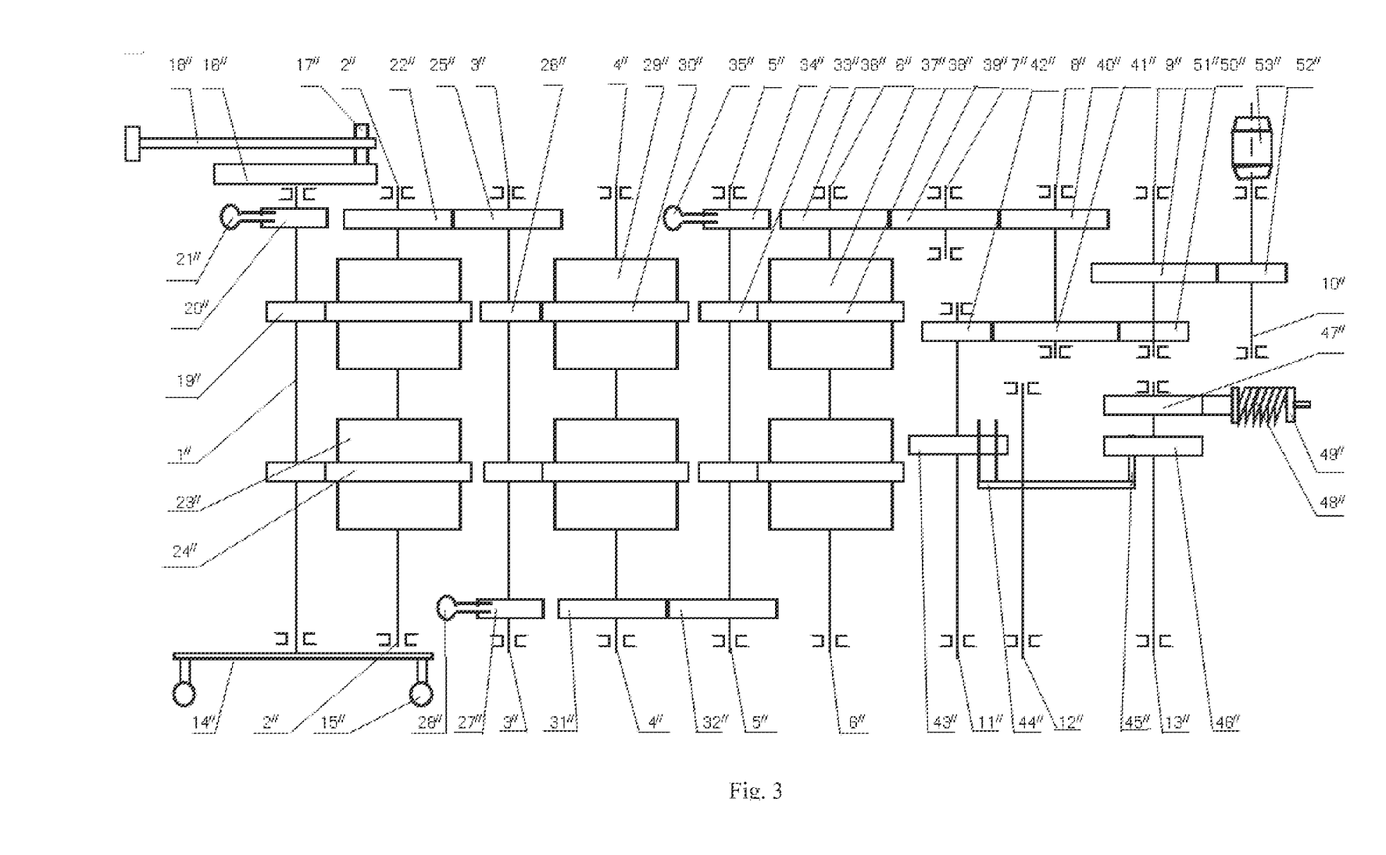
FIG. 3 schematically shows an energy storage power generation apparatus comprising six energy storage boxes of three stages and a movement mechanism using removable pushrod or a hand operating turntable.

FIGS. 1 to 3 show the embodiments of the present disclosure. According to these embodiments, the body-building power generation apparatus of the present disclosure comprises:

at least one fitness device, an energy storage device connected with the fitness device for transforming and storing the kinetic energy transmitted from the fitness device, wherein the energy stored in the energy storage device can be transformed into kinetic energy and outputted by an output mechanism connected with the energy storage device, a speed changing mechanism, receiving the kinetic energy from the output mechanism and outputting said kinetic energy after adjusting it, and a generator connected to the speed changing mechanism for transforming the adjusted kinetic energy into electric energy.

In an embodiment which is not shown, an adjustment controlling mechanism and an electric energy storage device are connected to the generator.

The electric energy storage device is a rechargeable battery.

Figure 8:
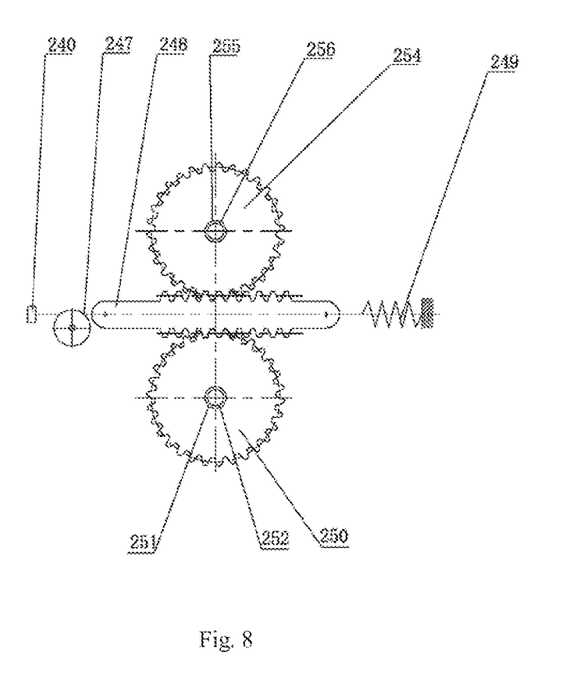
FIG. 8 schematically shows the cord pulling movement mechanism of FIG. 7.

As shown in FIG. 8, two or more of the fitness device, energy storage device, speed changing mechanism, generator, adjustment controlling mechanism, and the electric energy storage device are assembled into at least one function box with an input port and an output port, said function box being made of wood or metal.

As shown in FIGS. 1 to 3, the speed changing mechanism comprises a single-stage or multi-stage speed-up gearbox, and a damper speed regulator module connected with said speed-up gearbox.

The damper speed regulator module comprises:

a coupling gear engaged with one gear in the speed-up gearbox, a speed stabilizing gear connected with a rotation shaft to which the coupling gear is connected, a pivoted fork, a driving lever of which is connected with the speed stabilizing gear, an inertial wheel connected with one end of the pivoted fork that is away from the driving lever through an eccentric shaft, and a damper coil spring comprising an elastomer and a coil spring, wherein one end of the coil spring and the inertial wheel are connected to a rotation shaft and the other end thereof is connected with one end of the elastomer, an adjusting screw rod or adjusting nut is connected to the other end of the elastomer. In an embodiment which is not shown, the coil spring can be substituted with a leaf spring, wherein the center portion of the leaf spring is fixed to the same shaft as the inertial wheel, and the two ends thereof are connected with the elastomer.

In an embodiment which is not shown, the energy storage device comprises an energy storage box or an energy storage gear, inside which an energy storage elastomer is arranged. The energy storage box or energy storage gear transforms the kinetic energy produced by the fitness device into potential energy in the energy storage elastomer.

As shown in FIGS. 4 to 7, the fitness device includes foot pedal type, hand operating type, and hybrid type device of the foot pedal type and the hand operating type, a power transmission mechanism of the fitness device being connected with the energy storage device.

The power transmission mechanism comprises a gear unit, a belt drive unit, a chain drive unit, or a friction drive unit.

As shown in FIG. 1, the speed changing mechanism is provided with a clutch switch module for switching the levels of the speed changing mechanism, the clutch switch module can be operated with a manual driving lever by hand or a electromagnetic driving means.

The present disclosure further discloses a method of generating power through body-building exercises, with the power generation apparatus of the present disclosure. Kinetic energy is generated when a body builder is doing exercises on the fitness device, transformed into a form of energy that is able to be stored in the energy storage device, then stored in the energy storage device and output from the output mechanism, and the kinetic energy outputted is transmitted into the generator for power generation through the speed changing mechanism.

A plurality of body-building power generation apparatuses are arranged in fitness device intensive areas such as residential areas, gymnasiums, fitness centers, parks, and office buildings. The electric power generated from the plurality of body-building power generation apparatuses is accumulated and provided to those areas or to the state grid. The electric power generated by the body-building power generation apparatuses in each house of a residential building or community, or a office building, or a large scale leisure facility can be transmitted in to a set of adjustment controlling mechanism and rechargeable battery through cables and cords, and then outputted from the adjustment controlling mechanism to local areas or stage grid. By centralizing electric power separately generated and providing it to the local areas or the state grid, the electric power can be fully used and the requirements of electricity can be better met. A reasonably designed energy storage assembly of energy storage box or energy storage gear can store sufficient energy, so as to guarantee a capacity of the generator of continuously working for over 24 hours.

The present disclosure will be further explained in combination with the following examples.

EXAMPLE 1

FIG. 1 schematically shows a foot pedal type energy storage power generation apparatus comprising six energy storage boxes of two stages and a hand operating clutch switching mechanism. The fitness device is a foot-pedal type device. The energy storage mechanism comprises two stages of energy storage boxes, with each stage comprising three energy storage boxes of the same specifications. A non-return ratchet is arranged on the center axle of each stage energy storage box, in order to ensure that the energy can be transmitted only from high level potential energy in the first stage energy storage boxes to low level potential energy in the second stage energy storage boxes. The energy storage boxes in the two stages are in series connection with one another, and store energy like an impounding reservoir retains water. The coil spring damper speed regulator module with adjustable tensile force acts as a valve controlling the outflow volume of potential energy. Two hand operating clutch switch modules are provided, wherein the first clutch switch module comprises a sliding gear 19, a spline shaft at one end of an axle 2, and a clutch driving lever 20 which can be switched to either an energy storage state or a state of speed changing driven by direct transmission; the second clutch switch module comprises a sliding gear 39, a spline shaft at one end of an axle 9, a driving lever 40, and a stop rod 41 connected with the driving lever 40. At the time when the driving lever 40 and the sliding gear 39 disengage from a gear 38, the stop rod 41 jams the gear 38 to lock in, and maintain the elastic potential energy in the energy storage box. When the driving lever 40 restores its position, the gear 38 engages with the sliding gear 39 and the stop rod loosens, and then the potential energy in the energy storage box is placidly outputted. The two hand operating clutch switch modules can be connected with a connecting rod (not shown), i.e., the clutch switch modules enable the kinetic energy generated by the movement mechanism to be transmitted directly through the speed changing mechanism to the generator, or to be transformed into elastic potential energy and then placidly transmitted to the generator. The raw electric power from the generator is processed and outputted by the adjustment controlling mechanism and the lithium battery pack (not shown).

The foot pedal type energy storage power generation apparatus comprises: an axle 1, and a foot pedal 17 and a gear 16 which are both fixed to axle 1; an axle 2, and a gear 201 which is fixed to the axle 2 and connected to the gear 16 through a link chain 18, wherein a spline shaft on which the sliding gear 19 is arranged is provided on one end of the axle 2, and the sliding gear 19 is connected to the driving lever 20 to form the two levels of the clutch switch module, so that at the first level, the sliding gear 19 is engaged with a gear 21 and at the second level, the sliding gear 19 is engaged with a gear 54; an axle 3, and a non-return ratchet 24, a tension pawl 25, the gear 21, and a hub located inside an energy storage box 22 which are fixed to the axle 3, wherein the axle 3 passes through the energy storage box 22 and a gear 23 which is fixed to the energy storage box 22; an axle 4, and three gears 26 and a gear 27 which are fixed to the axle 4, wherein the three driven gears 26 are respectively engaged with three gears 23; an axle 5, and a gear 28, a non-return ratchet 29, a tension pawl 30, and a hub of an energy storage box 31 which are fixed to the axle 5, wherein the axle 5 passes through the energy storage box 31 and a gear 32 which is fixed to the energy storage box 31; an axle 6, and three driven gears 33 and a gear 34 which are fixed to the axle 6, wherein the three driven gears 33 are respectively engaged with three gears 32; an axle 7, and a gear 35 and a gear 36 which are fixed to the axle 7, wherein the gear 35 is engaged with an upper stage gear 34; an axle 8, and gear 37 and a gear 38 which are fixed to the axle 8, wherein the gear 37 is engaged with the upper stage gear 36; an axle 9 and a gear 42 and a gear 53 which are fixed to the axle 9, wherein a spline shaft, with which a sliding gear 39 is connected, is arranged on one end of the axle 9, the sliding gear 39 and the driving lever 40 are connected with each other to form a clutch switch module, and the driving lever 40 is connected to the stop rod 41; an axle 10, and a gear 43 and a gear 44 which are fixed to the axle 10, wherein the gear 43 is engaged with an upper stage gear 42; an axle 11, and a gear 45 which is fixed to the axle 11, wherein the gear 45 is engaged with the upper stage gear 44, and a generator 56 which is in axle connection with the axle 11; an axle 12, and a gear 46 and a speed stabilizing gear 47 which are fixed to the axle 12, wherein the gear 46 is engaged with the upper stage gear 38; an axle 13, and a pivoted fork 48 which is fixed to the axle 13, wherein a double driving lever on a branch at one end of the pivoted fork 48 is connected to the speed stabilizing gear 47; an axle 14, and an inertial wheel 49 and the inner hub of a coil spring 50 which are fixed to the axle 14, wherein the inertial wheel 49 is connected with the shaft sleeve at one end of the pivoted fork 48 through an eccentric shaft, the inner ring of the coil spring 50 is fixed to the hub thereof and the outer ring thereof is connected with an adjustable spring 51 through an union piece, and the tension of the coil spring 50 and that of the spring 51 are adjusted by an adjusting screw-and-nut 52; and an axle 15, and a gear 54 and a gear 55 which are fixed to the axle 15, wherein when the driving lever 20 is switched to the second level, the gear 54 is engaged with the gear 19, and power is transmitted through axle 15 to gear 55 which is connected to a gear 53 through a link chain 56, at this point, the sliding gear 39 disengages from the gear 38 and the stop rod 41 jams the gear 38 so as to lock in the transmission of the potential energy of the potential box, thereby transmitting power directly to the speed changing gear set.

EXAMPLE 2

Figure 4:
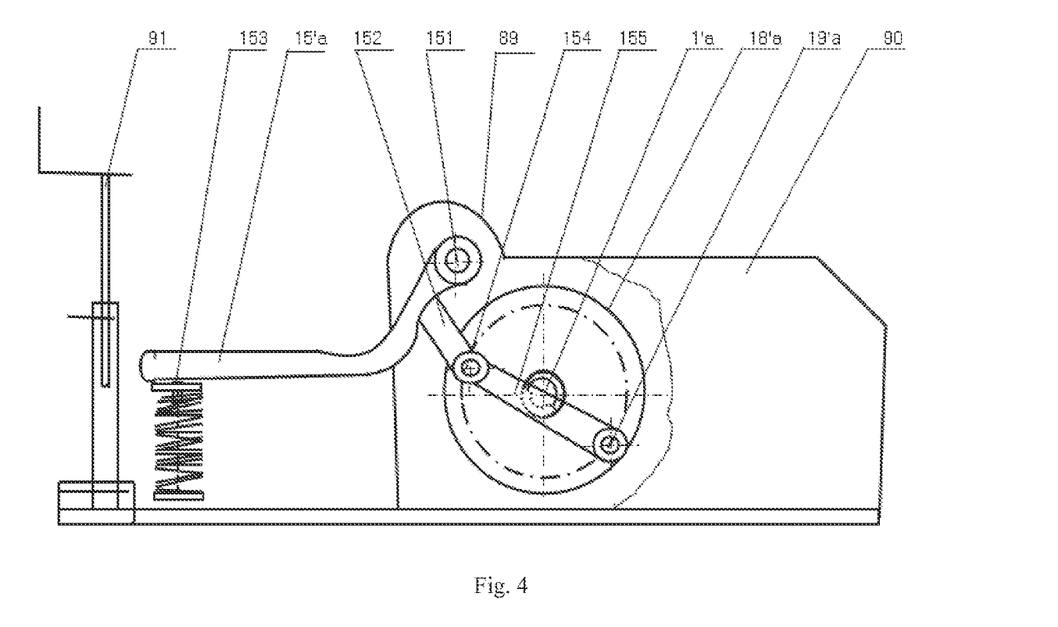
FIG. 4 schematically shows the side view cross section of an energy storage power generation apparatus comprising a sitting and foot pressing type fitness device.
Figure 5:
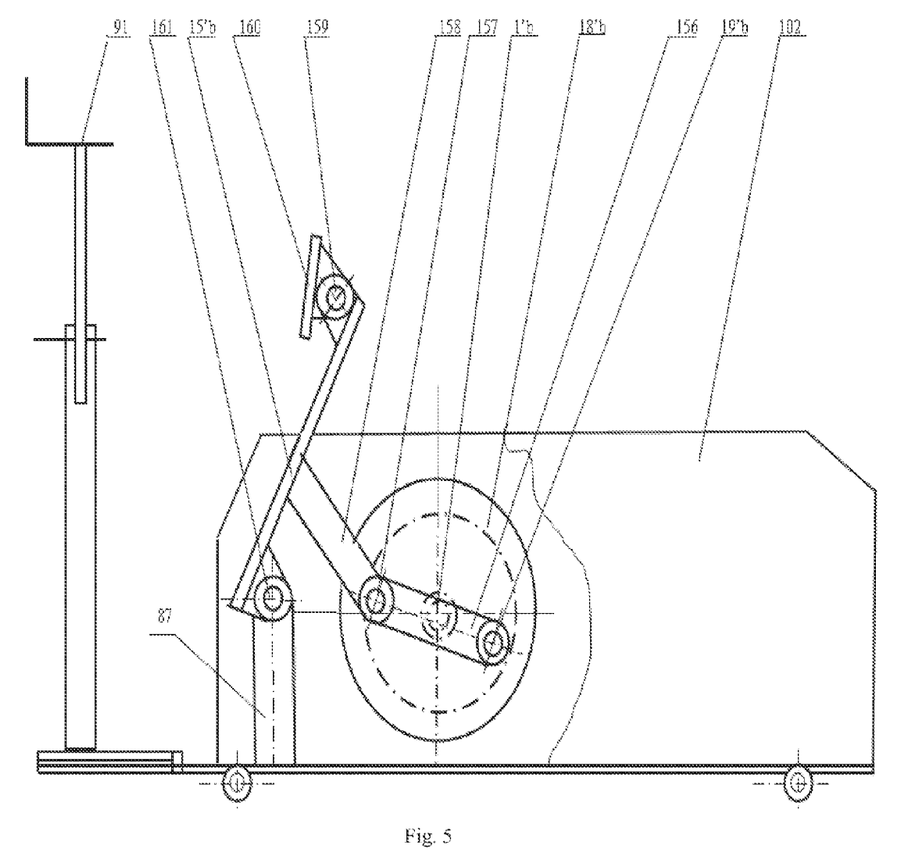
FIG. 5 schematically shows the side view cross section of an energy storage power generation apparatus comprising a sitting and foot-pedal type movement mechanism.
Figure 6:
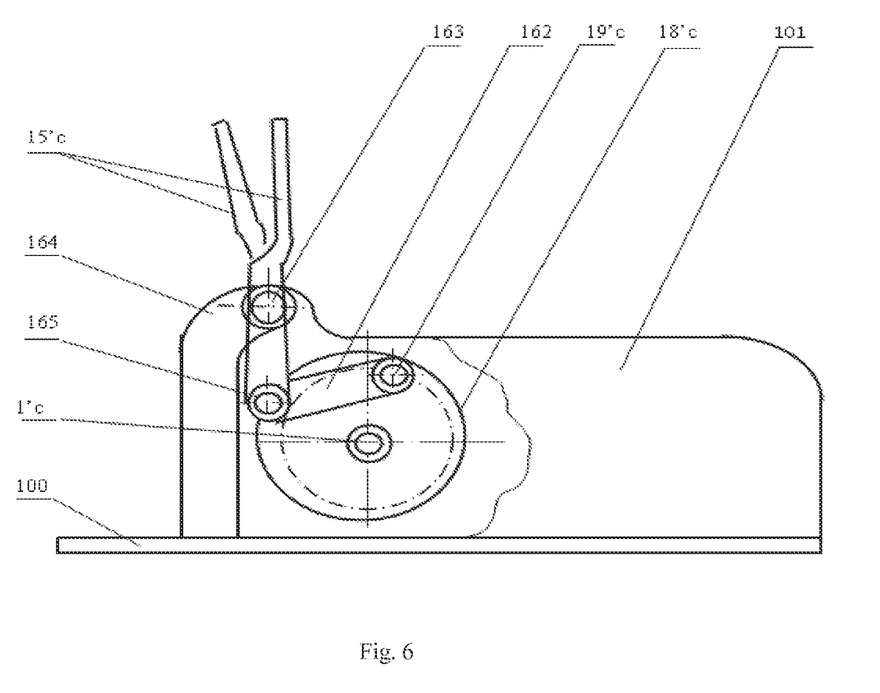
FIG. 6 schematically shows the side view cross section of an energy storage power generation apparatus comprising a stand-up hand operating push/pull movement mechanism.

FIG. 2 schematically shows an energy storage power generation apparatus comprising two combined-type energy storage gears of two stages and a foot-pedal type movement mechanism or a hand operating lever push/pull movement mechanism. The motion part of the fitness device comprises two discs having eccentric shafts which are fixed on an axle 1', a fixed support, and a foot pedal piece or hand operating push/pull piece. The foot pedal type fitness movement mechanism is as shown in FIG. 4 and FIG. 5 and the hand operating lever push/pull movement mechanism is as shown in FIG. 6, wherein the fitness devices are of bilaterally symmetrical arrangement. The energy storage mechanism adopts combined-type energy storage gears of two stages, with non-return ratchet arranged on the center shaft of each stage energy storage gear, so that the two stages of energy storage gears are like two reservoirs in series connection, and the energy can only flow from the high level potential energy position at the first stage to the low level potential energy position at the second stage. A leaf spring damper speed regulator module with adjustable tensile force acts as a valve controlling the outflow volume of potential energy.

The energy storage power generation apparatus comprises: an axle 1" and a ratchet 20', a tension pawl 21', a disc 18' having an eccentric shaft 19', a disc 16' having an eccentric shaft 17', and a combined-type energy storage gear which are fixed to the axle 1', wherein axle 1' passes through the combined-type energy storage gear comprising three energy storage boxes 22' which are fixed to a gear 23' through a key 24', the hubs located inside the energy storage boxes 22' are fixed to the axle 1', the eccentric shaft 17' on the disc 16' is connected with a driving lever of a movement mechanism 14', and the eccentric shaft 19' on the disc 18' is connected with a driving lever of a movement mechanism 15'; an axle 2', and a gear 25' and a gear 26' which are both fixed to the axle 2', wherein the gear 25' is engaged with a gear 23'; an axle 3', and a gear 27', a non-return ratchet 28', and a tension pawl 29' which are fixed to the axle 3', wherein the gear 27' is engaged with the upper stage gear 26', the hubs of the three energy storage boxes 30' through which axle 3' passes are fixed to the axle 3', and the energy storage boxes 30' and a gear 32' are fixedly connected together through a key 31' to form a rigid combined-type energy storage gear; an axle 4', and a gear 33' and a gear 34' which are both fixed to the axle 4', wherein the gear 33' is engaged with the gear 32'; an axle 5', and a gear 35' and a gear 36' which are fixed to the axle 5', wherein the gear 35' is engaged with the upper stage gear 34'; an axle 6', and a gear 37' and a gear 38' which are both fixed to the axle 6', wherein the gear 37' is engaged with the upper stage gear 36'; an axle 7', and a gear 39' and a speed stabilizing gear 40' which are both fixed to the axle 7', wherein the gear 39' is engaged with the upper stage gear 38'; an axle 8', and a pivoted fork 41' which is fixed to axle 8', wherein a double driving lever on a branch at one end of the pivoted fork 41' is connected to the speed stabilizing gear 40'; an axle 9', and an inertial wheel 42' and a leaf spring 43' which are both fixed to the axle 9', wherein an eccentric shaft on the inertial 42' is connected with a shaft sleeve at one end of the pivoted fork 41', the two ends of the leaf spring 43' are fixed to a spring 45' through a union piece 44', the damping characteristics of the leaf spring 43' and the spring 45' can be adjusted by a screw-and-nut 46' so as to adjust the rotating velocity of the speed stabilizing gear 40'; an axle 10', and a gear 47' and a gear 48' which are both fixed to the axle 10', wherein the gear 47' is engaged with the upper stage gear 38'; an axle 11', and a gear 49' and a gear 50' which are both fixed to the axle 11', wherein the gear 49' is engaged with the upper stage gear 48'; an axle 12', and a gear 51' which is fixed to the axle 12', wherein the gear 51' is engaged with the upper stage gear 50'; and an axle 13', and a gear 52' which is fixed to the axle 13', wherein a generator 53' is in axle connection with the axle 13'. The raw electric power generated by the generator 53' is processed and outputted by an adjustment controlling mechanism and a rechargeable battery pack (not shown).

EXAMPLE 3

FIG. 3 schematically shows an energy storage power generation apparatus comprising six energy storage boxes of three stages and a movement mechanism using removable push/pull rod or hand operating turntable. The movement mechanism is in form of a hand operating disc and a detachable hand push/pull rod fixed to the two ends of a shaft. A shaft sleeve is arranged on one end of a push/pull rod 18". A disc 16" which is fixed to an axle 1" has an eccentric shaft 17", wherein the eccentric shaft 17" is connected to the shaft sleeve at one end of the push/pull rod 18", and the push/pull rod 18 can be detached or mounted at anytime. The apparatus adopts three-stage combined-type energy storage mechanism. The power gear directly drives the gear of the energy storage box. A non-return ratchet is arranged on the drive shaft of each stage energy storage box, so that the three stages of energy storage boxes are like reservoirs in series connection, and the energy can only flow from the high level potential energy position at the upper stage to the low level potential energy position at the lower stage. A coil spring damper speed regulator module with adjustable tensile force acts as a valve controlling the outflow volume of the potential energy. The kinetic energy accumulated by energy storage boxes of each stage is smoothly transmitted to the speed-up gear for speed changing, and then to the generator for power generation. The raw electric power is processed and outputted by an electric control module and a rechargeable battery (not shown).

The power generation apparatus comprises: an axle 1", and two power gears 19", a non-return ratchet 20", a tension pawl 21", a hand operating disc 14", and a disc 16" having an eccentric shaft 17" which are fixed to the axle 1", wherein a hand lever 15" is arranged on the periphery of the hand operating disc 14", and the eccentric shaft 17" on the disc 16" is connected to the push/pull rod 18" through the shaft sleeve thereof; an axle 2", and a gear 22" which is fixed to the axle 2" and two energy storage boxes 23" through which axle 2" passes, wherein the hubs of the energy storage boxes 23" are fixed to the axle 2", the energy storage boxes 23" are fixed to the gears 24", and the two gears 24" are respectively engaged with two power gears 19" on axle 1"; an axle 3", and a gear 25", a power gear 26", a non-return ratchet 27", and a tension pawl 28" which are fixed to axle 3", wherein the gear 25" is engaged with the gear 22"; an axle 4", and a gear 31" which is fixed to the axle 4" and two energy storage boxes 29" through which axle 4" passes, wherein the hubs of the energy storage boxes 29" are fixed to the axle 4", the energy storage boxes 29" are fixed to a gear 30", and the gear 30" is engaged with the power gear 26"; an axle 5", and a ratchet 34", a tension pawl 35", two power gear 33", and a gear 32" which are fixed to the axle 5", wherein the gear 32" is engaged with the upper stage gear 31"; an axle 6", a gear 36" which is fixed to the axle 6", and two energy storage boxes 37" through which axle 6" passes, wherein the hubs of the energy storage boxes 37" are fixed to the axle 6", and the energy storage boxes 37" are fixed to a gear 38" which is engaged with the power gear 33"; an axle 7", and a gear 39" which is fixed to the axle 7", wherein the gear 39" is engaged with a gear 36"; an axle 8", and a gear 40" and a gear 41" which are both fixed to the axle 8", wherein the gear 40" is engaged with the upper stage gear 39"; an axle 9", and a gear 50" and a gear 51" which are both fixed to the axle 9", wherein the gear 50" is engaged with the upper stage gear 41"; an axle 10", a gear 52" which is fixed to the axle 10", and a generator 53" which is in axle connection with the axle 10"; an axle 11", and a gear 42" and a speed stabilizing gear 43" which are fixed to the axle 11", wherein the gear 42" is engaged with the gear 41"; an axle 12", and a pivoted fork 44" which is fixed to the axle 12", wherein a shaft of a driving lever on a branch of the pivoted fork 44" is connected with the speed stabilizing gear 43"; and an axle 13", and an inertial wheel 46" and a coil spring 47" which are fixed to the axle 13", wherein an eccentric shaft 45" fixed on the inertial wheel 46" is connected with a shaft sleeve of the pivoted fork 44", the coil spring 47" is fixed to the axle 13" through a hub on the inside thereof and the outer side thereof is connected with an adjustable spring 48", the damping characteristics of the coil spring 47" and the adjustable spring 48" are adjusted by an adjusting screw-and-nut 49".

EXAMPLE 4

FIG. 4 schematically shows an energy storage power generation apparatus comprising a sitting and foot pressing type fitness device. The apparatus comprises a seat 91, a movement mechanism comprising two foot pressing pieces arranged respectively on the left and right sides thereof, on which alternate pressing movement can be done (a single foot pressing piece is also feasible), and an energy storage power generator box 90. Each foot pressing piece comprises a foot pedal 15'a, a stand column 89 arranged on a base which is connected with the footboard 15'a through a hinge pin 151 and supports the footboard 15'a, a rib plate 152 which is fixed to the footboard 15'a, a spring 153 which is connected with the pedal 15'a, and a connecting rod 155 which is connected with the rib plate 152 through a hinge pin 154. The connecting rod 155 is connected with an eccentric shaft 19'a which is fixed to a disc 18'a, and the disc 18'a is fixed to a power shaft 1'a of the energy storage box power generator box 90. The disc and eccentric shaft connecting rod power mechanism of the present disclosure can be substituted with a crankshaft and connecting rod mechanism.

EXAMPLE 5

FIG. 5 schematically shows an energy storage power generation apparatus comprising a sitting and foot-pedal type movement mechanism. The apparatus comprises a seat 91, a movement mechanism comprising two foot pedal pieces arranged respectively on the left and right sides thereof, on which alternate stepping movement can be done (a single foot pedal is also feasible), and an energy storage power generator box 102. Each foot pedal piece comprises a pressure lever 15'b, a pedal 160 which is connected with the pressure lever 15'b through a hinge pin 159, a support column 87 on the base which is connected with the pressure lever 15'b through a hinge pin 161, a rib plate 158 which is fixed to the pressure lever 15'b, a connecting rod 156 which is connected with the rib plate 158 through a hinge pin 157. The connecting rod 156 is connected with an eccentric shaft 19'b which is fixed to a disc 18'b, and the disc 18'b is fixed to a power shaft 1'b of the energy storage power generator box 102. The disc and eccentric shaft foot pedal mechanism can be substituted with a crankshaft and connecting rod mechanism.

EXAMPLE 6

FIG. 6 schematically shows an energy storage power generation apparatus comprising a standing and hand operating push/pull movement mechanism. The apparatus comprises a base support 100, two sets of push/pull levers respectively on the left and right sides, and an energy storage power generator box 101.

The hand operating push/pull movement mechanism comprises a stand column 164 which is fixed to the base support 100, a pair of push/pull levers 15'c which are connected with the stand column 164 on both sides thereof through hinge pin 163. The push/pull levers 15'c are connected with a connecting rod 162 through a hinge pin 165. The connecting rod 162 is connected with an eccentric shaft 19'c which is fixed to a disc 18'c, and the disc 18'c is fixed to a power shaft 1'c of the energy storage power generator box 101.

EXAMPLE 7

Figure 7:
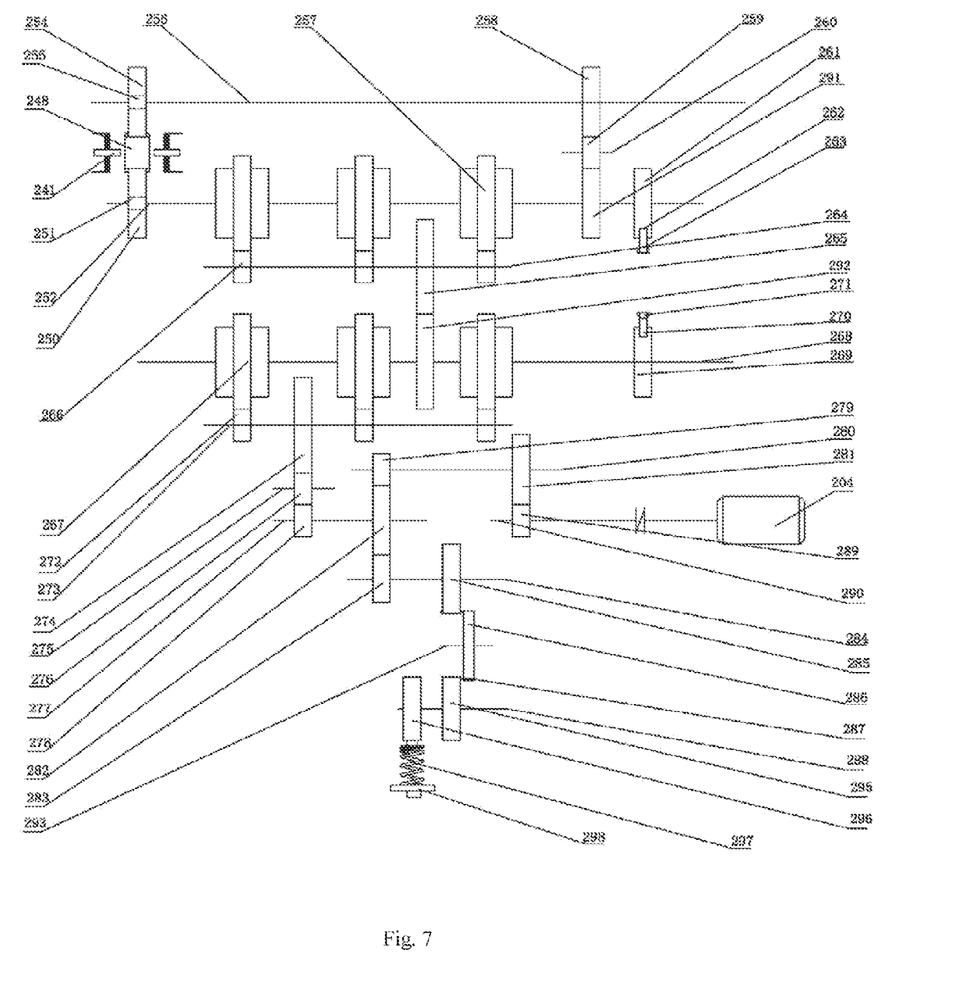
FIG. 7 is a structural schematic diagram of an energy storage power generation apparatus comprising a cord pulling movement mechanism.

FIG. 7 and FIG. 8 schematically show an energy storage power generation apparatus comprising 6 sets of energy storage gears of two stages and a hand operating cord pulling movement mechanism. As shown in FIG. 8, the hand operating cord pulling movement mechanism comprises a hand pulling cord 240, a leading sheave 247 of the pulling cord, a toothed bar 248, a spring 249, a gear 250 comprising a one-way bearing 251, a gear 254 comprising a one-way bearing 255, a transmission shaft 252 which is connected with the gear 250, and a transmission shaft 256 which is connected with the gear 254. The gear 254 is engaged with the upper tooth surface of the toothed bar 248 and the gear 250 is engaged with the lower tooth surface of the toothed bar 248. The toothed bar 248 moves between limit roller trains 241. When the toothed bar 248 is pulled by the pulling cord 240 and moves toward an outer side between the limit roller trains 241, it drives the gear 250 to rotate. The gear 250 drives the transmission shaft 252 to rotate and leaves the gear 254 idling. And then the spring 249 tensions. When the pulling cord 240 is released, the elastic force accumulated in the spring 249 drives the toothed bar 248 to move backward between the limit roller trains 241. The toothed bar 248 drives the gear 254 to rotate and the gear 254 drives the transmission shaft 256 to rotate, leaving the gear 250 idling.

As shown in FIG. 7, an energy storage mechanism of the apparatus comprises six combined-type energy storage gears of two stages, with three energy storage gears in series connection in each stage. The energy storage mechanism comprises a gear 258 which is fixed to the transmission shaft 256, and a gear 291, a non-return ratchet 261, a pawl 262, and a spring 263 which are fixed to the transmission shaft 252, and three rotatable energy storage gears 257 which are incapable of endwise slip and passes through the transmission shaft 252. The energy storage mechanism also comprises: an axle 260, and a reversing gear 259 which is fixed to the axle 260, wherein the reversing gear 259 is engaged with the upper stage gear 258, and the lower stage gear 291 is engaged with the reversing gear 259; an axle 264, and three driven gears 266 and a transmission gear 265 which are fixed to the axle 264, wherein the three driven gears are respectively engaged with the three energy storage gears 257; an axle 268 to which a driven gear 292, a non-return ratchet 269, a pawl 270, and a spring 271 are fixed, and three rotatable energy storage gears 267 which passes through axle 268 and are incapable of axial sliding, wherein the gear 292 is engaged with an upper stage gear 265; an axle 273, and three driven gears 272 and a transmission gear 274 which are fixed to the axle 273, wherein the three driven gears 272 are respectively engaged with the three energy storage gears 267; an axle 275, and a reversing gear 276 which is fixed to the axle 275, wherein the reversing gear 276 is engaged with the upper stage gear 274; an axle 277, and a driven gear 278 and a transmission gear 282 which are both fixed to the axle 277, wherein the driven gear 278 is engaged with the upper stage gear 276; an axle 284, and a driven gear 283 and a speed stabilizing gear 285 which are both fixed to the axle 284, wherein the driven gear 283 is engaged with the upper stage gear 282; an axle 293, and a pivoted fork 286 which is fixed to the axle 293, wherein the pivoted fork 286 is connected with the speed stabilizing gear 285 through a fork lever; an axle 288, and an inertial balance wheel 295 and an inner hub of a coil spring 296 which are both fixed to the axle 293, wherein the pivoted fork 286 is connected with an eccentric shaft 287 of the inertial balance wheel 295, the outer end of the coil spring is connected with an adjustable spring 297 through a union piece, and the adjustable spring 297 is fixed to a support or a box through an adjusting screw-and-nut 298, and the damping characteristics of the springs can be adjusted by the adjusting screw-and-nut 298; an axle 280, and a gear 279 and a gear 281 which are both fixed to the axle 280, wherein the gear 279 is engaged with the transmission gear 282; and an axle 290, and a gear 289 which is fixed to the axle 290, wherein the gear 289 is engaged with the upper stage gear 281, and the axle 290 is in axle connection with a generator 204.

EXAMPLE 8

Figure 9:
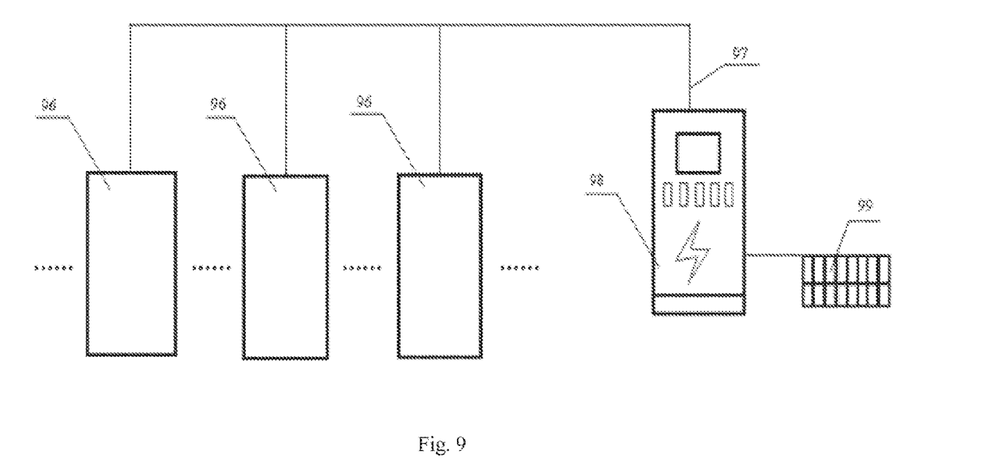
FIG. 9 schematically shows an energy storage generator which is in a form of a function box.

FIG. 9 schematically shows an energy storage generator which is in a form of a function box. A plurality of body-building power generation devices 96, which are separately or centrally arranged, is connected with a set of electric control modules 98 and rechargeable batteries 99 through electric cable 97. The raw electric power generated by the plurality of body-building power generation devices 96 is purified by the electric control modules 98 and the rechargeable batteries 99 and then provided to the local areas or state grid.

Although the present disclosure has been described with reference to preferred embodiments, various modifications could be made to the present disclosure without departing from the scope of the present disclosure and components in the present disclosure could be substituted with equivalents. Particularly, as long as there is no structural conflict, all the technical features mentioned in all the embodiments may be combined together in any manner. The present disclosure is not limited to the specific embodiments disclosed in the description, but rather includes all technical solutions falling into the scope of the claims.

The invention claimed is:

1. A body-building power generation apparatus, comprising:
    at least one fitness device,
    an energy storage device connected with the fitness device for transforming and storing kinetic energy transmitted from the fitness device, wherein the energy stored in the energy storage device can be transformed into kinetic energy and outputted by an output mechanism connected with the energy storage device,
    a speed changing mechanism, receiving the kinetic energy from the output mechanism and outputting said kinetic energy after adjusting it, and
    a generator connected to the speed changing mechanism for transforming the adjusted kinetic energy into electric energy, wherein an adjustment controlling mechanism and an electric energy storage device are connected to the generator, and
    wherein two or more of the fitness device, the energy storage device, the speed changing mechanism, the generator, the adjustment controlling mechanism, and the electric energy storage device are assembled into at least one function box with an input port and an output port, said function box being made of wood or metal.

2. The power generation apparatus according to claim 1, wherein the electric energy storage device is a rechargeable battery.

3. The power generation apparatus according to claim 1, wherein the speed changing mechanism comprises:
    a single-stage or multi-stage speed-up gearbox, and
    a damper speed regulator module connected with said speed-up gearbox.

4. The power generation apparatus according to claim 3, wherein the damper speed regulator module comprises:
    a coupling gear engaged with one gear in the speed-up gearbox,
    a speed stabilizing gear connected with a rotation shaft to which the coupling gear is connected,
    a pivoted fork, a driving lever of which is connected with the speed stabilizing gear, an inertial wheel connected with one end of the pivoted fork that is away from the driving lever through an eccentric shaft, and a damper coil spring comprising an elastomer and a coil spring, wherein one end of the coil spring and the inertial wheel are connected to a rotation shaft, and the other end thereof is connected with one end of the elastomer, an adjusting screw rod or adjusting nut being connected to the other end of the elastomer.

5. The power generation apparatus according to claim 1, wherein the energy storage device comprises an energy storage box or an energy storage gear, inside which an energy storage elastomer is arranged, and the energy storage box or energy storage gear transforms the kinetic energy produced by the fitness device into potential energy in the energy storage elastomer.

6. The power generation apparatus according to claim 1, wherein the fitness device includes foot pedal type device, hand operating type device, and hybrid type device of the foot pedal type and the hand operating type, and the fitness device is connected with the energy storage device via a power transmission mechanism.

7. The power generation apparatus according to claim 6, wherein the power transmission mechanism comprises a gear unit, a belt drive unit, a chain drive unit, or a friction drive unit.

8. The power generation apparatus according to claim 1, wherein the speed changing mechanism is provided with a clutch switch module for switching the levels of the speed changing mechanism, and the clutch switch module can be operated with a manual driving lever or an electromagnetic driving means.

9. A method of generating power through body-building exercises with the power generation apparatus according to any one of claims 1, 2 and 3 to 8, wherein kinetic energy is generated when a body builder is doing exercise on the fitness device, transformed into a form of energy that is able to be stored in the energy storage device, then stored in the energy storage device and output from the output mechanism, and the kinetic energy outputted is transmitted to the generator for power generation through the speed changing mechanism.

10. The method according to claim 9, wherein a plurality of the body-building power generation apparatuses are arranged in fitness device intensive areas, such as residential areas, gymnasiums, fitness centers, parks, and office buildings, and the electric power generated from the plurality of body-building power generation apparatuses is accumulated and then provided to those areas or to the state grid.

* * * * *

UNITED STATES PATENT AND TRADEMARK OFFICE
CERTIFICATE OF CORRECTION

PATENT NO. : 9,457,217 B2
APPLICATION NO. : 14/370888
DATED : October 4, 2016
INVENTOR(S) : Xiaolin Yin et al.

Page 1 of 1

It is certified that error appears in the above-identified patent and that said Letters Patent is hereby corrected as shown below:

Title Page, item (71), Applicant:

"Xiaolin Yin"

should read

--Wuji Yin--

Title Page, item (30), Foreign Application Priority Data:

"Apr. 19, 2013 (CN) ......2013 2 0199991 U"

should read

--Apr. 19, 2013 (CN) ......2013 2 0199991--

Signed and Sealed this
Twentieth Day of December, 2016

Michelle K. Lee
*Director of the United States Patent and Trademark Office*